United States Patent

[11] 3,588,630

| [72] | Inventors | David S. Miller<br>Severna Park, Md.;<br>Elmo James Presia, Williamstown; Alan G. Cooper, North Adams, Mass. |
|---|---|---|
| [21] | Appl. No. | 826,342 |
| [22] | Filed | May 21, 1969 |
| [45] | Patented | June 28, 1971 |
| [73] | Assignee | Sprague Electric Company<br>North Adams, Mass. |

[54] NONPOLAR FEED-THROUGH SOLID ELECTROLYTE CAPACITOR
7 Claims, 3 Drawing Figs.

| [52] | U.S. Cl. | 317/230, 317/242 |
|---|---|---|
| [51] | Int. Cl. | H01g 1/02 |
| [50] | Field of Search | 317/230, 231, 233 |

[56] References Cited
UNITED STATES PATENTS

| 3,115,596 | 12/1963 | Fritsch | 317/230 |
| 3,255,386 | 6/1966 | Millard et al. | 317/230 |

*Primary Examiner*—James D. Kallam
*Attorneys*—Connolly and Hutz, Vincent H. Sweeney, James Paul O'Sullivan and David R. Thornton ABSTRACT: A nonpolar feed-through solid electrolyte capacitor is provided by forming a feed-through solid electrolyte capacitor within the aperture of another solid electrolyte capacitor of tubular configuration, electrically connecting their respective cathodes and connecting the anode of the outer capacitor to a casing. The capacitor assembly offers a low line-to-ground impedance path for high frequency signals and noise and low frequency low impedance path through the feed-through capacitor. High frequency shielding is achieved by a full 360° continuous, noninductive connection between the grounding lead from the tubular capacitor to the housing and between the capacitor cathodes.

PATENTED JUN28 1971

3,588,630

3,588,630

NONPOLAR FEED-THROUGH SOLID ELECTROLYTE CAPACITOR

BACKGROUND OF THE INVENTION

This invention relates to a solid electrolyte capacitor, and more particularly to a solid electrolyte nonpolar feed-through capacitor.

It has become well known in the communications and related electronic arts to utilize polar feed-through capacitors to suppress undesirable high frequency, signals and/or noise. The interference signals or noise are bypassed to ground through the capacitor dielectric and the main signal is transmitted through the conducting portion of the capacitor. There are however, many circuit applications where reversals of polarity in the circuit may harm a polarized capacitor. It is therefore the principal object of the invention to provide a nonpolar device capable of passing low frequency signals and rejecting undesirable high frequency signals and/or noise.

It is a further object to provide such a device having a minimum series inductance and maximum high frequency shielding.

SUMMARY OF THE INVENTION

Broadly, this invention relates to a nonpolar high frequency/noise filter device. More particularly, the invention relates to a nonpolar feed-through capacitor comprising two polarized solid tantalum pellet capacitors, the first having a tubular configuration and the second having a cylindrical construction and designed to be accommodated within the cavity of the tubular capacitor. The cathodes of the two capacitors are electrically connected and a grounding connection is made to a metal casing by means of a grounding ring attached to the anode of the tubular capacitor. A feed-through connection may be established either by using a feed-through lead through the second capacitor or by inserting the lead ends into the body of the second capacitor and using the anode as the conductor.

DETAILED DESCRIPTION OF THE PRESENT INVENTION

Figure 1:
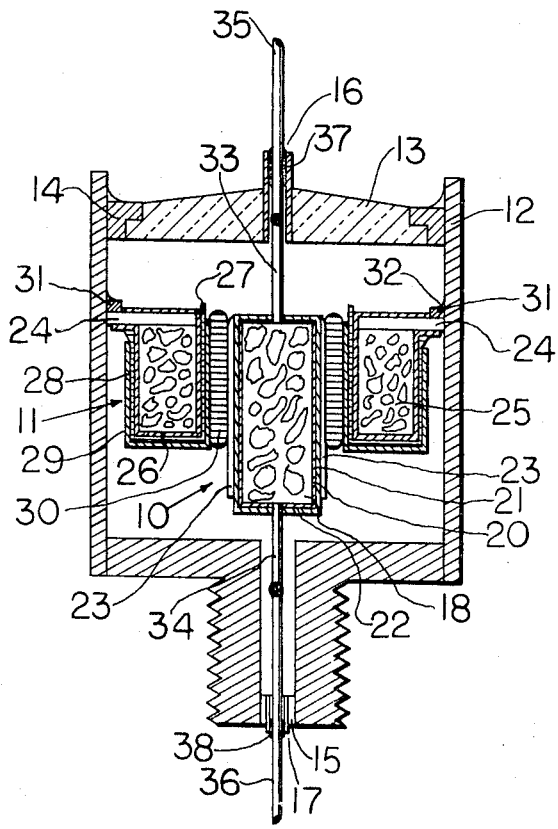
FIG. 1 is a sectional view of a feed-through capacitor according to the present invention.

In FIG. 1, an example of a nonpolar feed-through capacitor is presented. Capacitors 10 and 11 are mounted within a casing 12. One end of the casing 12, which may be of copper or brass construction, is hermetically sealed by means of glass-to-metal end seal 13 including metallic ring 14 which is soldered to the casing. The other (threaded) end of casing 12 is sealed by glass-to-metal seal 15. Eyelets 16 and 17 are formed at the nonthreaded and threaded ends, respectively. Capacitor 10 is a solid electrolyte section of the type described in detail in U.S. Pat. No. 2,936,514 issued to R. J. Millard on May 17, 1960. For purposes of this description, capacitor 10 comprises an anode 18 of sintered tantalum which is provided with a dielectric layer 20 of tantalum oxide. A solid electrolyte 21, e.g., manganese dioxide, is thereafter applied and a carbon layer 22 is coated onto the electrolyte surface. A silver (or other solderable metal) layer 23 is provided over the carbon layer 22.

Capacitor 11 is prepared in a manner similar to capacitor 10 excepting that, after a preliminary sintering of the tantalum anode, a tantalum grounding ring 24 is welded in place on the top surface of anode 25. The ring may be resistance welded in a few places and the pellet again sintered to remove contamination due to the welding and to establish a stronger bond between anode and ring. The tantalum anode-ring assembly is anodized to form oxide layer 26. Arranged on layer 26 is a solid electrolyte layer 27, carbon layer 28 and silver layer 29 all of which are masked from the exposed surface of ring 24. The cathodes of capacitors 10 and 11 are electrically connected by means of solder strip 30. This solder forms an intimate, continuous, noninductive bond between the two capacitors and, since it runs along the entire inner lateral surface of capacitor 11, is especially effective in providing a R.F. shield between the feed-through terminals of the capacitor, preventing any undesirable transmission of R.F. energy from either direction.

Grounding ring 24 is assembly fitted to abut the wall of housing 12. Since tantalum is not solderable, a solderable metallic ring 31, i.e., nickel, is welded to the tantalum, the ring, in turn, being connected to the casing wall by means of a continuous solder ring 32. This ring, like the solder ring 30 between the capacitors, provides an effective shielding against R.F. seepage along edges of the grounding ring.

Risers 33 and 34, positioned at the approximate midpoints of respective eyelets 16 and 17, form the lead-in connections to capacitor 10. Tinned leads 35 and 36 are welded to risers 33 and 34 respectively and solder seals 37 and 38 complete the hermetic sealing.

Figure 2:
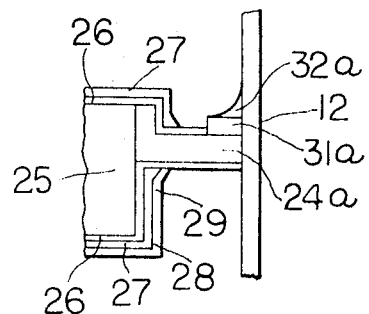
FIG. 2 is a partial sectional view of an alternate grounding ring configuration.

FIG. 2 shows an alternate embodiment of the grounding ring 24 wherein ring 24a is attached, by welding and sintering, to the lateral surface of anode 25. As with grounding ring 24, connection to the wall of casing 12 is made by a nickel ring 31a and a solder ring 32a.

Figure 3:
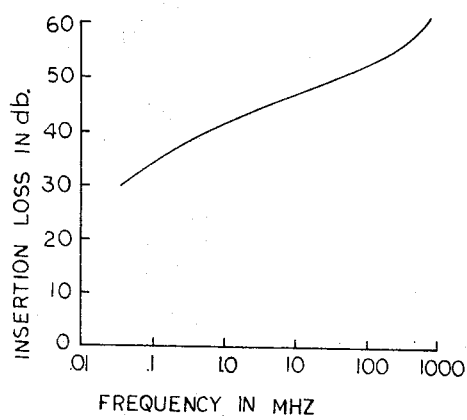
FIG. 3 is a typical insertion loss v. frequency curve for the device shown in FIG. 1.

The insertion loss curve shown in FIG. 3 is a plot of two 6.8 $\mu$f. capacitors constructed in accordance with this invention. The insertion loss at the high frequency ends of the curve is superior to the performance of prior art polar feed-through capacitors.

An alternate embodiment of FIG. 1 may be constructed wherein the two capacitor units are electrically connected across a common solid electrolyte layer rather than the carbon, metal, solder connection shown in FIG. 1. This embodiment would reduce the resistance between the capacitors and increase temperatures at which the capacitor could be used.

We claim:

1. A nonpolar feed-through solid electrolyte capacitor comprising:
    a first porous electrode section of sintered anodizable metal and of tubular construction having on its surface a dielectric film;
    a second porous electrode section of sintered anodizable metal having on its surface a dielectric film and having lead-in connections to the sintered metal projecting from opposite ends; said second section being disposed within the cavity of said first section;
    a solid electrolyte layer overlying the dielectric films of said first and second sections and forming a common connection between said sections along the surface of said second section and abutting portion of said first section;
    a sealed elongated hollow conductive casing housing the electrode sections, a grounding ring connected to the sintered metal of said first section and to the walls of said casing in circumferential noninductive connection, and said lead-in connections of said second section extending through openings in the opposite hermetically sealed ends of said casing.

2. The capacitor of claim 1 wherein said first and second electrode sections have a conductive film overlying said solid electrolyte layer and the common connection between said sections is effected by means of a continuous 360° solder flow intermediate abutting conductive films.

3. The capacitor of claim 1 wherein the sintered metal of said first and second sections is tantalum, and the grounding ring of said first section is tantalum connected to said casing walls by means of a solderable metal.

4. The capacitor of claim 3 wherein the grounding ring is connected to the end surface of the sintered metal of said first section.

5. The capacitor of claim 3 wherein the grounding ring is connected to the lateral surface of the sintered metal of said first section.

6. The capacitor of claim 1 wherein said grounding ring includes an anodizable metal member joined to the sintered metal of said first section and a solderable metal member joined to said anodizable metal member and soldered to said casing walls by a continuous 360° solder flow.

7. The capacitor of claim 6 wherein said anodizable metal member is a tantalum ring and said solderable metal member is a nickel ring which is welded to said tantalum ring.